United States Patent [19]
Hayakawa

[11] Patent Number: 6,073,762
[45] Date of Patent: Jun. 13, 2000

[54] APPARATUS FOR ENCASING A DISC-TYPE RECORDING MEDIUM THEREIN

[75] Inventor: Morito Hayakawa, Tokyo, Japan

[73] Assignee: NEC Corporation, Tokyo, Japan

[21] Appl. No.: 09/069,680

[22] Filed: Apr. 29, 1998

[30] Foreign Application Priority Data

Apr. 30, 1997 [JP] Japan .................................. 9-113193

[51] Int. Cl.[7] .............................. B65D 85/57; G11B 3/70
[52] U.S. Cl. ........................................ 206/308.1; 369/291
[58] Field of Search ................................ 206/307, 307.1, 206/308.1, 308.3, 309–313; 312/9.47, 9.41, 9.48, 9.58, 9.59, 9.61, 9.43, 9.28, 9.11, 9.15; 369/289, 290, 291, 292, 75.2, 77.1

[56] References Cited

U.S. PATENT DOCUMENTS

| | | | |
|---|---|---|---|
| 4,330,161 | 5/1982 | Khawand ............................. | 312/9.58 |
| 4,331,242 | 5/1982 | Scott .................................... | 312/9.58 |
| 4,881,640 | 11/1989 | Herr et al. ........................... | 206/313 |
| 5,617,950 | 4/1997 | Chung ................................. | 206/308.1 |
| 5,720,386 | 2/1998 | Allsop et al. ....................... | 206/308.1 |
| 5,746,314 | 5/1998 | Knutsen et al. .................... | 206/308.1 |
| 5,779,037 | 7/1998 | D'Agaro et al. ................... | 206/308.1 |

FOREIGN PATENT DOCUMENTS

| | | |
|---|---|---|
| 4132642 | 9/1992 | Japan . |
| 7254199 | 3/1995 | Japan . |
| 7254201 | 3/1995 | Japan . |
| 7254263 | 3/1995 | Japan . |
| 9-320162 | 12/1997 | Japan . |

OTHER PUBLICATIONS

CRB–533 CDU76E–01 Product Specification Rev. 0.1, p. 25.

Primary Examiner—Paul T. Sewell
Assistant Examiner—Luan K. Bui

[57] ABSTRACT

There is provided an apparatus for encasing a disc-type recording medium, including a disc tray on which a disc-type recording medium is to be supported, a case in which the disc tray is encased, a pair of rails formed in the case and each extending in a first direction in which the disc tray is drawn out of the case and put into the case, a member movable along the rails and supporting the disc tray, the member comprising a first member bridging across the rails and a second member at least partially, circumferentially surrounding the disc tray, and a connection shaft for connecting the disc tray to the member so that the disc tray is rotatable about the connection shaft. For instance, the connection shaft extends in parallel with the first direction, and connects the disc tray to the second member at a midpoint of a width of an outermost edge of the second member which width extends perpendicular to the first direction. In accordance with the apparatus, since the disc tray is rotatable relative to the member, a disc-type recording medium could be readily put on the disc tray when the apparatus is used in such a manner that the case stands vertically with respect to a width-wise direction thereof.

32 Claims, 13 Drawing Sheets

APPARATUS FOR ENCASING A DISC-TYPE RECORDING MEDIUM THEREIN

BACKGROUND OF THE INVENTION

1. Field of the Invention

The invention relates to a so-called disc apparatus, that is, an apparatus including a disc tray on which a disc-type recording medium is mounted, and a case wherein a disc tray is designed to be able to be drawn out of and put into the case.

2. Description of the Related Art

There have been suggested a variety of apparatuses for encasing a disc-type recording medium therein. For instance, one of such apparatuses has been suggested in SONY, CRB-533: CDU76E-01 Product Specification Rev. 0.1, pp. 25. FIG. 1 illustrates the suggested apparatus. As illustrated in FIG. 1, the apparatus 40 includes a main body or box 41, a disc tray 52 designed to be drawn out of the box 41, and four stoppers 5 formed on a surface of the disc tray 52 for securing a disc-type recording medium 10 on the disc tray 52. The box 41 is formed at opposite inner walls thereof with grooves 6 extending in a direction in which the disc tray 52 is drawn out of the box 41. The disc tray 52 is formed at longitudinal edges thereof with projections 57 extending in the same direction as the grooves 6. The projections 57 are designed to fit into the grooves 6. Hence, the disc tray 52 is slidable relative to the box 41.

In the apparatus 40 illustrated in FIG. 1, the disc tray 52 is vertically supported. However, the apparatus 40 may be supported in such a manner that the disc tray 52 horizontally supported.

An operation of the apparatus 40 is explained hereinbelow with reference to FIG. 1. When the disc-type recording medium 10 is to be inserted into the box 41, it is necessary to draw the disc tray 52 out of the box 41. By pulling the disc tray 52 in a direction indicated with an arrow C, the projections 57 of the disc tray 52 slide along the grooves 6 of the box 41, and accordingly, the disc tray 52 is drawn out of the box 41.

Though the disc tray 52 is manually drawn out of the box 41 in the above-mentioned operation, a driver mechanism including a gear train 8 and an electric motor (not illustrated) may be incorporated in the box 41 for mechanically drawing the disc tray 52 out of the box 41 and inserting into the box 41.

When the apparatus 40 is used with the disc tray 52 stands vertically, as illustrated in FIG. 1, a user draws the disc tray 52 out of the box 41, and then, place the recording medium 10 onto the disc tray 52. While supporting the disc-type recording medium 10 with a hand for avoiding the recording medium 10 to drop from the disc tray 52, the stoppers 5 are rotated with other hand in directions indicated with arrows in FIG. 1. Thus, the recording medium 10 is rocked onto the disc tray 52, and is never slipped out of the disc tray 52.

Then, a user pushes the disc tray 52 into the box 41 in a direction indicated with an arrow D. Thus, the recording medium 10 is encased in the box 41.

When the recording medium 10 is to be taken out of the apparatus 40, the steps inverse to the above-mentioned steps are conducted. That is, the disc tray 52 is first drawn out of the box 41. With the recording medium 10 being supported with a hand, the stoppers 5 are rotated in the opposite directions. Then, the recording medium 10 is taken out from the disc tray 52.

Another apparatus having a loading tray support structure has been suggested in Japanese Unexamined Utility Model Publication No. 4-132642. FIG. 2 is a perspective view of the loading tray support structure of the apparatus.

As illustrated in FIG. 2, the loading tray support structure of the apparatus 61 includes a body 71, a pair of guide rails 75 formed at opposite ends of the body 71 and each formed with a rectangular groove (only one of the guide rails 75 is illustrated in FIG. 2), a rail 73 fixed on the body 71 and extending in a direction X in which a disc tray 72 is drawn out. The disc tray 72 is formed at a surface thereof with a circular recess 72a on which a disc-type recording medium is mounted. The disc tray 72 is formed with a bearing 74 and a pair of rectangular projections 76. The rail 73 is inserted into the bearing 74 of the disc tray 72 for slide movement, and the rectangular projections 76 are fit into the rectangular grooves of the guide rails 75. Thus, the disc tray 72 is movable relative to the body 71 with the bearing 74 sliding along the rail 73 and further with the projections 76 sliding in the grooves of the guide rails 75.

Still another apparatus has been suggested in Japanese Unexamined Patent Publications Nos. 7-254201, 7-254199 and 7-254263. FIG. 3 illustrates the suggested apparatus. As illustrated in FIG. 3, the suggested apparatus 81 includes a chassis 90, a disc tray 82, a slide rail 84 for sliding the disc tray 82 relative to the chassis 90, and a front plate 91 secured to a front end of the disc tray 82. The disc tray 82 is formed at a surface thereof with a circular recess 82a in which a disc-type recording medium is mounted. The slide rail 84 is comprised of a first rail 98 fixed to the chassis 90, a second rail 97 fixed to the disc tray 82, and a third rail 99 slidable between the first and second rails 98 and 97.

In operation, by pulling the front plate 61 in a direction indicated with an arrow A, the second rail 97 slides relative to the third rail 99, and concurrently the third rail 99 slides relative to the first rail 98. As a result, the disc tray 82 slides relative to the chassis 90 in the direction A.

However, the above-mentioned conventional apparatuses are accompanied with problems as follows.

As mentioned earlier, the apparatuses are often used with a disc tray being vertically supported. In such a case, when a disc-type recording medium is to be inserted into the box or chassis, the disc tray is first drawn out of the box, and then the recording medium is mounted on the disc tray while vertically supported with a hand of an operator. Then, the stoppers are rotated to thereby secure the recording medium to the disc tray in order to avoid the recording medium from slipping out of the disc tray. Then, the disc tray together with the recording medium is inserted into the box or chassis.

That is, when a recording medium was mounted on a disc tray, it was necessary in the conventional apparatuses to rotate stoppers with one of hands with the recording medium being supported with the other hand. The apparatuses usually have four stoppers, as the apparatus illustrated in FIG. 1. Hence, it was absolutely necessary to use both hands for mounting a recording medium onto a disc tray, resulting in operational difficulty.

SUMMARY OF THE INVENTION

It is an object of the present invention to provide an apparatus for encasing a disc-type recording medium therein, capable of setting a recording medium onto a disc tray with one hand.

There is provided an apparatus for encasing a disc-type recording medium, including (a) a disc tray on which a disc-type recording medium is to be supported, (b) a case in which the disc tray is encased, (c) a device for drawing the disc tray out of the case and putting the disc tray into the case, the disc tray being designed to be rotatable relative to the device.

There is further provided an apparatus for encasing a disc-type recording medium, including (a) a disc tray on which a disc-type recording medium is to be supported, (b) a case in which the disc tray is encased, (c) a member movable relative to the case and supporting the disc tray, the member comprising a first member bridging across the rails and a second member at least partially, circumferentially surrounding the disc tray, and (d) a connection shaft for connecting the disc tray to the member so that the disc tray is rotatable about the connection shaft.

For instance, the connection shaft may be designed to extend in parallel with the first direction or extend perpendicularly to a first direction in which the disc tray is drawn out of the case and put into the case.

For instance, the first member may be bar-shaped and the second member may be L-shaped 80 that the first and second members cooperate with each other to thereby form a rectangular space therebetween in which the disc tray is supported. As an alternative, the first and second members may be designed to cooperate with each other to thereby form a rectangular frame having a rectangular space in which the disc tray is supported.

The connection shaft may be designed to connect the disc tray to the second member only at an outermost edge of the second member, in which case, it is preferable that the connection shaft is arranged at a midpoint of a width of the outermost edge of the second member extending either perpendicular or parallel to the first direction.

The connection shaft may be designed to connect the disc tray to the first member, in which case, it is preferable that the connection shaft is arranged at a midpoint of a width of the first member extending perpendicular to the first direction.

The apparatus may further include a gear wheel rotatably supported by and in the case, and a rack formed with the member. The gear wheel is engaged to the rack when the disc tray is drawn out of and put into the case in the first direction. It is preferable for the apparatus to further include a power source for rotating the gear wheel. It is preferable that for the apparatus to further include a stopper for stopping the disc tray to rotate at a desired angle.

The apparatus may be designed to include two connection shafts one of which connects the disc tray to the first member, and the other of which connects the disc tray to the second member.

There is stir further provided an apparatus for encasing a disc-type recording medium, including (a) a disc tray on which a disc-type recording medium is to be supported, (b) a case in which the disc tray is encased, (c) a member movable relative to the case and supporting the disc tray, the member comprising a first member bridging across the rails and a second member at least partially, circumferentially surrounding the disc tray, (d) a connection shaft for connecting the disc tray to the member so that the disc tray is rotatable about; the connection shaft, the connection shaft extending in parallel with a first direction in which the disc tray is drawn out of the case and put into the case, (e) a power source for rotating the connection shaft, and (f) a transmission for transmitting a power from the power source to the connection shaft.

When the connection shaft is designed to extend in parallel with the first direction, the transmission may preferably include (a) a transmission shaft rotated by the power source, and (b) an endless belt set around both the transmission shaft and the connection shaft. As an alternative, when the connection shaft is designed to extend perpendicularly to the first direction, the transmission may preferably include (a) a transmission shaft rotated by the power source, and (b) a pair of bevel gears arranged between the transmission and connection shafts.

There is yet further provided an apparatus for encasing a disc-type recording medium, including (a) a disc tray on which a disc-type recording medium is to be supported, (b) a case in which the disc tray is encased, (c) a member movable relative to the case and supporting the disc tray, the member comprising a first member bridging across the rails and a second member at least partially, circumferentially surrounding the disc tray, and (e) a hinge system for rotatably connecting the disc tray to the member.

For instance, the hinge system may be arranged in such a manner that the disc tray is rotatable about either a first direction in which the disc tray is drawn out of the case and put into the case, or a direction perpendicular to the first direction. The hinge system may be designed to connect the disc tray to either the second member or the first member.

There is still yet further provided an apparatus for encasing a disc-type recording medium, including (a) a disc tray on which a disc-type recording medium is to be supported, (b) a case in which the disc tray is encased, (c) a member movable relative to the case and supporting the disc tray, the member comprising a first member bridging across the rails and a second member at least partially, circumferentially surrounding the disc tray, (e) a hinge system for rotatably connecting the disc tray to the member, (f) a power source for rotating the disc tray relative to the member, and (g) a transmission for transmitting a power from the power source to the disc tray.

For instance, the transmission may be designed to include (a) a transmission shaft rotated by the power source, and (b) a pair of bevel gears set between the transmission shaft and the disc tray.

The above-mentioned apparatus in accordance with the present invention provides an advantage as follows. When the apparatus is used with a disc tray being supported vertically to a ground, the disc tray, after having been drawn out of a case, is rotated by 90 degrees to thereby put the disc tray parallel to a ground. Thus, a disc-type recording medium can be mounted on the disc tray without supporting the recording medium with a hand. When the recording medium together with the disc tray is inserted into the case, the disc tray is rotated further by 90 degrees, and then, is inserted into the case.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

[First Embodiment]

Figure 1:
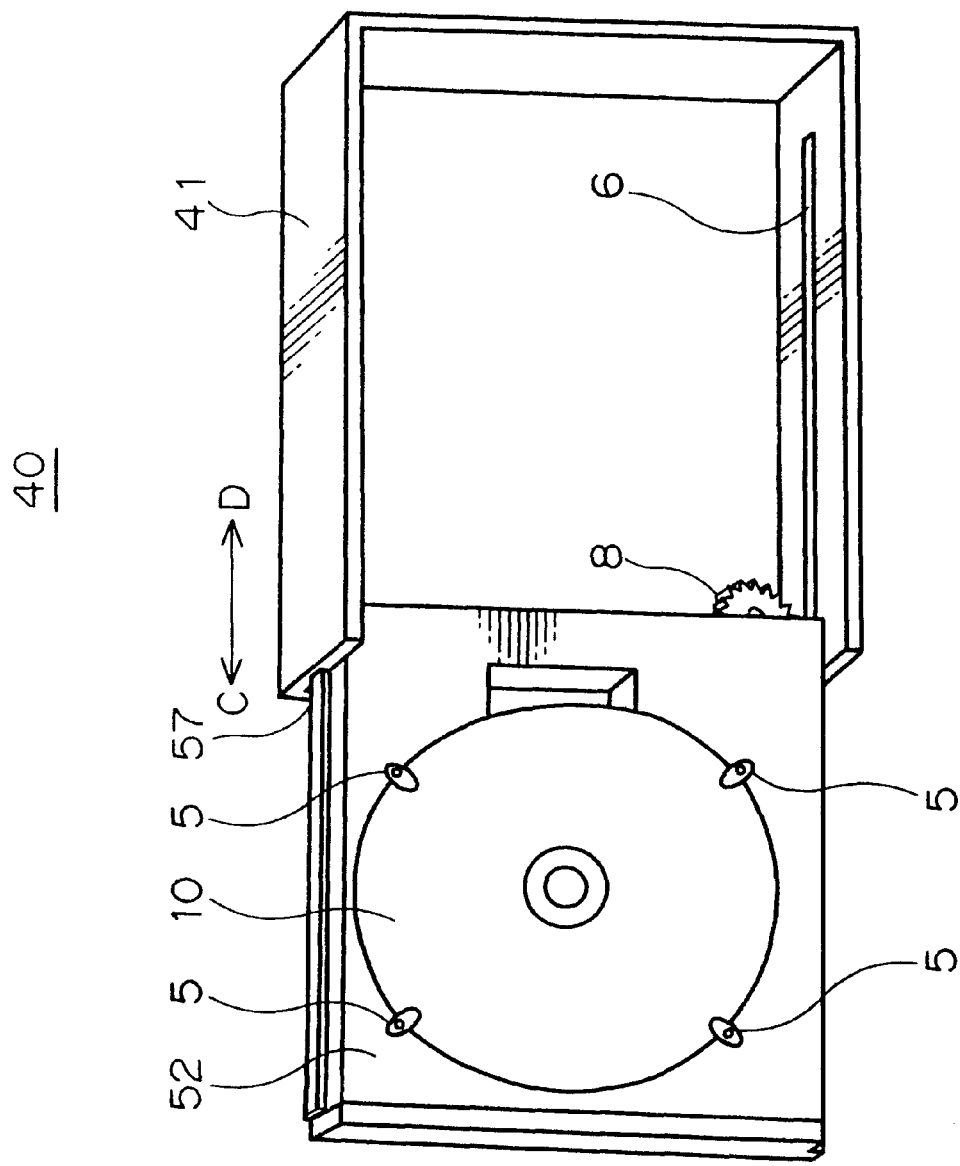
FIG. 1 is a perspective view illustrating the first conventional apparatus.
Figure 2:
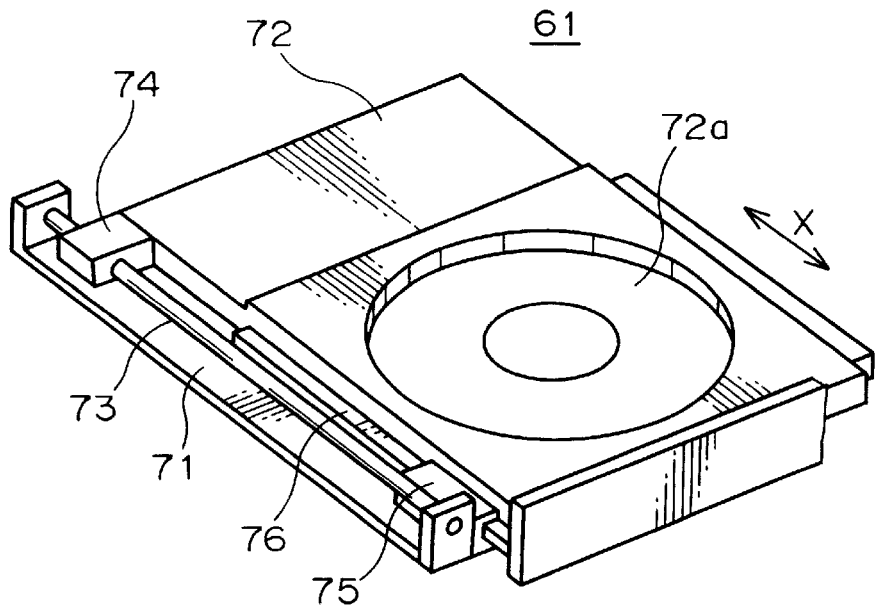
FIG. 2 is a perspective view illustrating the second conventional apparatus.
Figure 3:
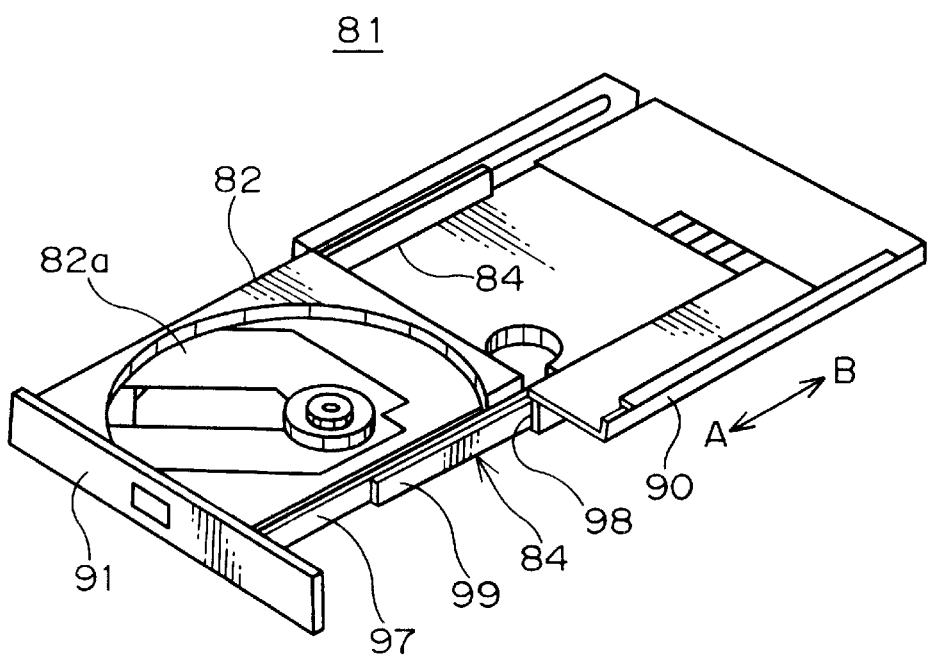
FIG. 3 is a perspective view illustrating the third conventional apparatus.
Figure 4:
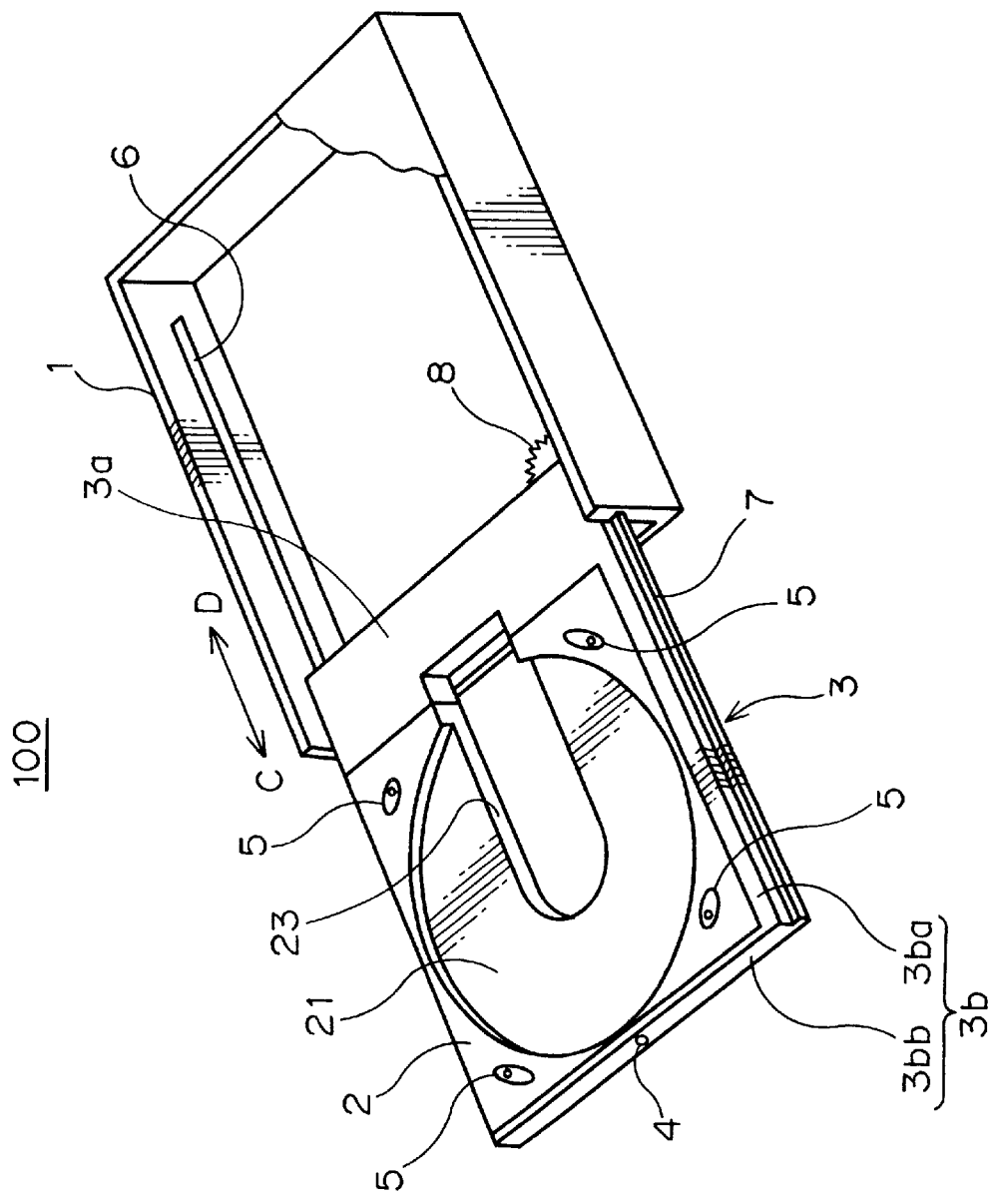
FIG. 4 is a perspective view illustrating an apparatus in accordance with the first embodiment.

FIGS. 4, 5, 6A and 6B illustrate an apparatus in accordance with the first embodiment of the present invention. In FIG. 4, the apparatus is arranged in such a manner that a disc tray is horizontally supported, whereas in FIGS. 6A and 6B, the apparatus is arranged in such a manner that a disc tray is vertically supported.

With reference to FIG. 4, the illustrated apparatus 100 includes a disc tray 2 on which a disc-type recording medium 10 (see FIGS. 6A and 6B) is to be supported, a case 1 in which the disc tray 2 is encased, a member 3 designed to be slidable relative to the case 1, and a connection shaft 4 connecting the disc tray 2 to the member 3 so that the disc tray 2 is rotatable thereabout.

The case 1 is a box having a thin wall. The case 1 is open only at one side through which the disc tray 2 is drawn out thereof and inserted thereinto. In FIG. 4, though a top of the case 1 is omitted for clarification of inside of the case 1, the case 1 is usually covered at a top thereof with a plate.

The case 1 is formed at opposite inner walls thereof with grooves 6 extending in a first direction in which the disc tray 2 is drawn out of the case 1 and inserted into the case 1. The grooves 6 are in parallel with each other, and extend in almost entire length of the inner walls of the case 1.

As mentioned earlier, the member 3 is designed slidable relative to the case 1. The member 3 is comprised of a first member 3a which is a bar in shape and which bridges across the grooves 6, and an L-shaped second member 3b. The L-shaped second member 3b is secured to the first member 3a so as to cooperate with each other to thereby form a rectangular space therebetween in which the disc tray 2 is supported. Specifically, the L-shaped second member 3b is comprised of a first plate 3ba perpendicularly extending from the first member 3a at an end thereof, and a second plate 3bb perpendicularly extending from the first plate 3ba from at a distal end thereof in a direction in which the first member 3a extends.

In the instant embodiment, the first member 3a and the second member 3b comprised of the first and second plates 3ba and 3bb are integrally formed in one-piece. However, it should be noted that they may be separately formed, and be secured to each other. The member 3 may be designed to be a frame so as to entirely surround the disc tray 2 therewith. As an alternative, if the disc tray 2 is designed to be circular, the member 3 may be designed to be ring-shaped so as to entirely surround the disc tray 2 accordingly.

The first plate 3ba of the second member 3b is formed at opposite edges thereof with rectangular projections 7. The rectangular projections 7 are designed to be fit into the grooves 6. Accordingly, the member 3 and hence the disc tray 2 supported in the member 3 is slidable relative to the case 1 in a direction in which the grooves 6 extend.

The means for moving the disc tray 2 relative to the case 1 is not to be limited to a combination of the above-mentioned grooves 6 and projections 7. For instance, a pair of guide shafts may be formed in the case 1, and the member 3 may be formed with through-holes through which the guide shafts are fit. This structure also enables the disc tray 2 to move relative to the case 1.

The disc tray 2 is a rectangular plate formed with a circular recess 21 in which the disc-type recording medium 10 is mounted. The disc tray 2 is also formed with a cut-out 23 extending from a center thereof to an edge thereof adjacent to the first member 3a of the member 3. When data is read out of or written into the recording medium 10 mounted onto the disc tray 2, a spindle motor for rotating the recording medium 10 or a head for reading data out of or writing data into the recording medium 10 is inserted through the cut-out 23.

Four stoppers 5 are arranged on the disc tray 2 around the circular recess 21. The stoppers 5 are rotatably secured to the disc tray 2, and hence, can overlap or retract from the circular recess 21 in dependence on a rotation angle thereof. Thus, when all the stoppers 5 project over the circular recess 21, a circle constituted of distal ends of the stoppers 5 would have a diameter smaller than a diameter of the recording medium 10. Hence, the stoppers 5 prevents the recording medium 10 from slipping out of the circular recess 21, even when the disc tray 2 is vertically supported in such a manner as illustrated in FIG. 6B.

As mentioned earlier, the connection shaft 4 connects the disc tray 2 only to the second plate 3bb of the second member 3b so that the disc tray 2 is rotatable relative to the second plate 3bb about the connection shaft 4. The connection shaft 4 extends in parallel with in the first direction in which the disc tray 2 is drawn out of and inserted into the case 1. The connection shaft 4 is located at a center of the second plate 3bb. Thus, even when the disc tray 2 is manually rotated about the connection shaft 4, it would be possible to stop the disc tray 2 at a desired rotation angle.

A general operation of the apparatus 100 illustrated in FIG. 4 is explained hereinbelow with reference to FIG. 4. As mentioned earlier, the projections 7 formed with the member 3 are fit into the grooves 6 formed at the inner walls of the case 1. Hence, the disc tray 2 can be drawn out of the case 1 by pulling the disc tray 2 together with the member 3 in a direction indicated with an arrow C.

Then, the disc-type recording medium 10 is put on the disc tray 2 within the circular recess 21. If the apparatus 100 is arranged in such a manner that the disc tray is horizontally supported as illustrated in FIG. 4, the stoppers 5 are not used. Thereafter, the member 3 is pushed into the case 1 in a direction indicated with an arrow D. Thus, the disc-type recording medium 10 put on the disc tray 2 is encased in the case 1.

Figure 5:
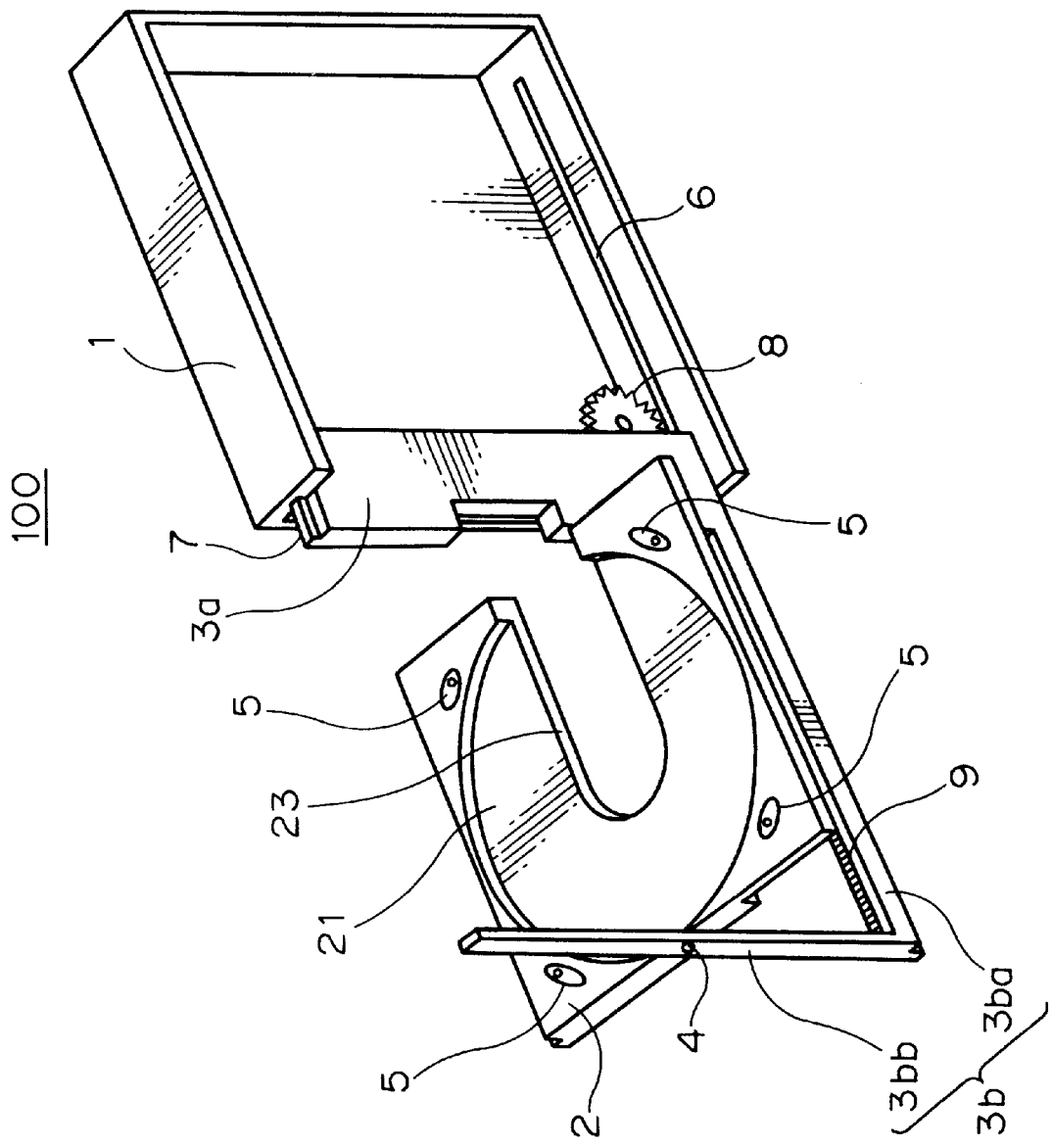
FIG. 5 is a perspective view illustrating the apparatus illustrated in FIG. 4 wherein a disc tray is rotated by about 90 degrees.

As partially illustrated in FIG. 5, the second plate 3ba of the second member 3 is formed at an inner wall thereof with a rack 9, and a gear wheel 8 is rotatably supported in the case 1. The gear wheel 8 is designed to engage to the rack 9 to thereby keep the member 3 stationary relative to the case 1. When the member 3 is moved in the direction indicated with an arrow C or D, the gear wheel 8 rotates to thereby facilitate movement of the member 3.

Though not illustrated in FIGS. 4 and 5, a power source such as an electric motor may be set in the case 1 for driving the gear wheel 8. The disc tray 2 can be automatically moved by means of such a power source. Namely, the disc tray 2 may be manually or automatically slid in the directions indicated with arrows C and D.

FIG. 5 illustrates the apparatus 100 supported in such a manner that the disc tray 2 is vertically supported. After the disc tray 2 is drawn out of the case 1, the disc tray 2 is rotated by about 90 degrees about the connection shaft 4. As a result, the circular recess 21 faces upward, or the disc tray 2 is horizontally supported. Hence, it is possible to put the recording medium 10 onto the circular recess 21 without supporting the disc tray 2 with a hand.

Figure 6A:
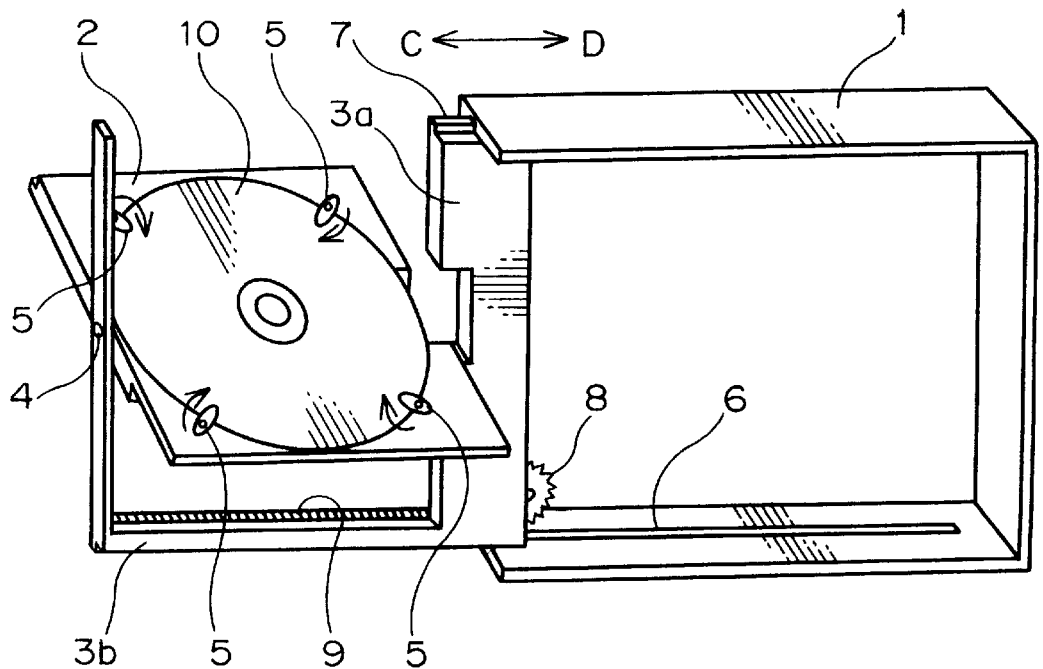
FIG. 6A is a perspective view illustrating the apparatus illustrated in FIG. 4 with a disc tray being rotated relative to a member.
Figure 6B:
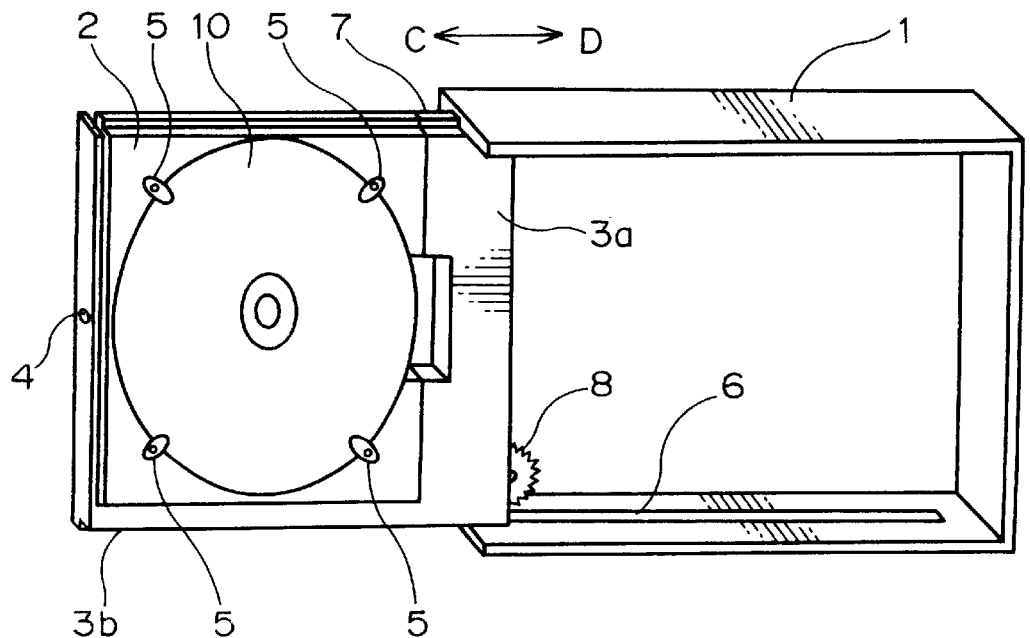
FIG. 6B is a perspective view illustrating the apparatus illustrated in FIG. 4 with a disc tray being put in the same plane as a member.

In FIGS. 6A and 6B, the disc-type recording medium 10 is mounted on the disc tray 2. An operation of the apparatus 100 is explained hereinbelow with reference to FIGS. 6A and 6B.

After drawing the disc tray 2 out of the case 1, an operator rotates the disc tray 2 by about 90 degrees about the connection shaft 4, as illustrated in FIG. 6A. By rotating the disc tray 2, the circular recess 21 faces upward. Then, an operator puts the recording medium 10 in the circular recess 21. Since the disc tray 21 is kept stationary, an operator can set the recording medium 10 onto the disc tray 2 without supporting the disc tray 2 with a hand.

After putting the recording medium 10 on the disc tray 2, an operator rotates the stoppers 5 to thereby fix the recording medium 10 in the circular recess 21. Thus, the recording medium 10 is never slipped out of the circular recess 21, even if the disc tray 2 is rotated.

Though the stoppers 5 are manually handled in the instant embodiment, they may be designed to automatically rotate, in which case, the stoppers 5 are retracted from the circular recess 21 while the disc tray 2 is located out of the case 1, and the stoppers 5 are automatically rotated when the disc tray 2 is inserted into the case 1.

After rotating the stoppers 5 for fixing the recording medium 10 onto the disc tray 2, the disc tray 2 is rotated further by about 90 degrees. Thus, the disc tray 2 is located in the same plane defined by the first and second members 3a and 3b, as illustrated in FIG. 6B. Then, the member 3 together with the disc tray 2 is inserted into the case 1 in the direction indicated with an arrow D.

[Second Embodiment]

Figure 7:
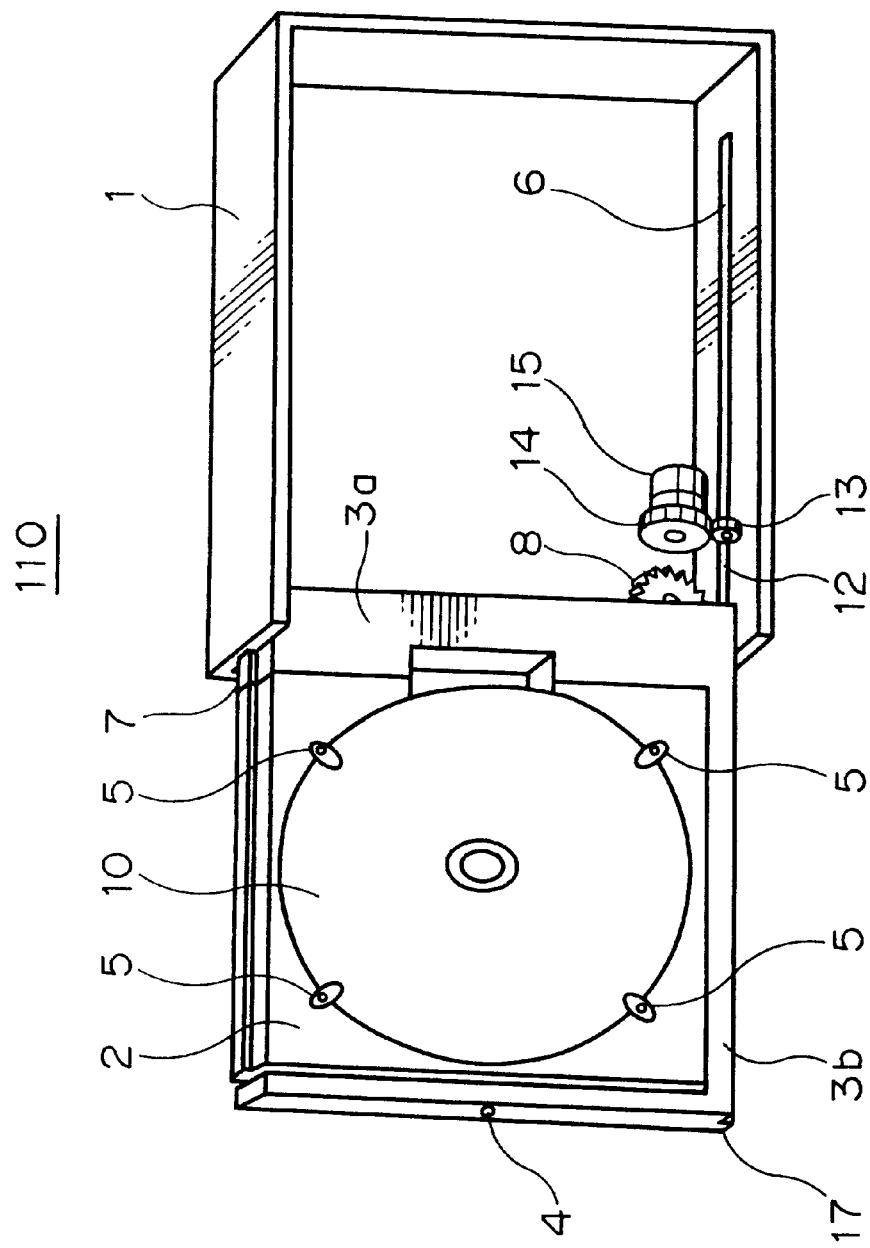
FIG. 7 is a perspective view illustrating an apparatus in accordance with the second embodiment.
Figure 8:
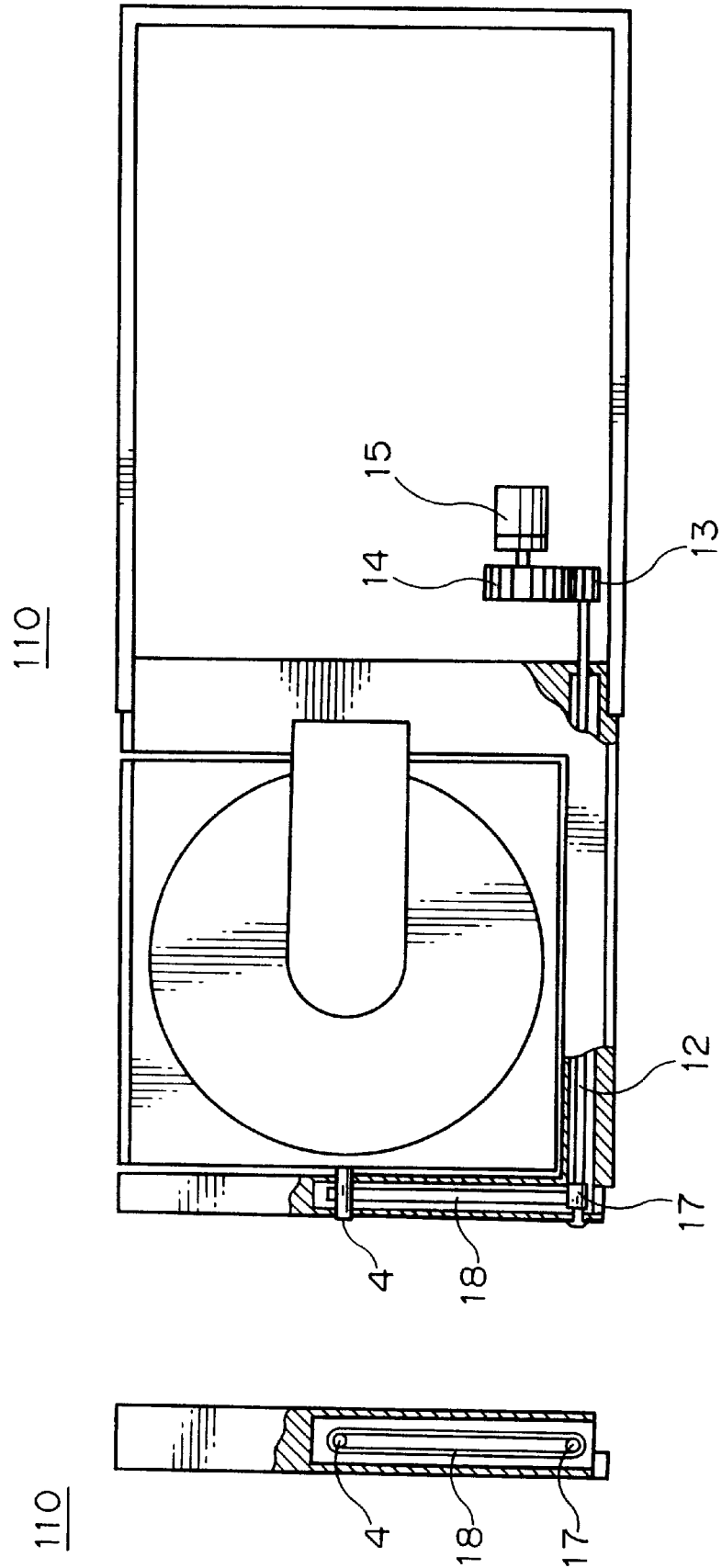
FIG. 8A is a front view of the apparatus illustrated in FIG. 7 with some parts broken away for clarification of inside of the apparatus.
FIG. 8B is a side view of the apparatus illustrated in FIG. 8A.

FIGS. 7, 8A and 8B illustrate an apparatus in accordance with the second embodiment. Whereas the disc tray 2 was manually rotated in the above-mentioned first embodiment, the disc tray 2 is automatically rotated. in the instant embodiment. Namely, an apparatus 110 in accordance with the second embodiment is provided further with a driver for rotating the disc tray 2.

The driver is comprised of an electric motor 15, as a power source, secured to the case 1, and a transmission for transmitting a power from the electric motor 15 to the connection shaft 4 to thereby rotate the connection shaft 4. The transmission includes a first gear wheel 14 coupled to a drive shaft of the electric motor 15, a second gear wheel 13 in mesh with the first gear wheel 14, a transmission shaft 12 fixed to the second gear wheel 13, a pulley 17 rotatably supported at an inner wall of the second plate 3bb of the second member 3 and connected to the transmission shaft 12, and an endless belt 18 wound around both the pulley 17 and the connection shaft 4.

In the instant embodiment, the first and second plates 3ba and 3bb of the second member 3b are formed hollow. The transmission shaft 12 extends through the hollow first plate 3ba, and connected to the pulley 17 for rotating the pulley 17. The endless belt 18 is situated in the hollow second plate 3bb.

An operation of the apparatus 110 is explained hereinbelow with reference to FIGS. 8A and 8B. By turning the electric motor 15 on, the first gear wheel 14 starts rotating. A power produced by the electric motor 15 is transmitted through the second gear wheel 13, the transmission shaft 12, the pulley 17, and the endless belt 18 to the connection shaft 4. Thus, the connection shaft 4 is rotated, that is, the disc tray 2 is automatically rotated.

For instance, a step motor may be employed as the electric motor 15. The use of a step motor makes it possible to rotate the connection shaft 4 and hence the disc tray 2 by desired angles, and to stop the connection shaft 4 at a desired rotation angle. As an alternative, there may be formed a stopper (not illustrated) for keeping the disc tray 2 in a horizontal position.

The driver enables an operator to use the apparatus 110 as if the disc tray 2 is horizontally supported, even if the disc tray is vertically supported.

[Third Embodiment]

Figure 9:
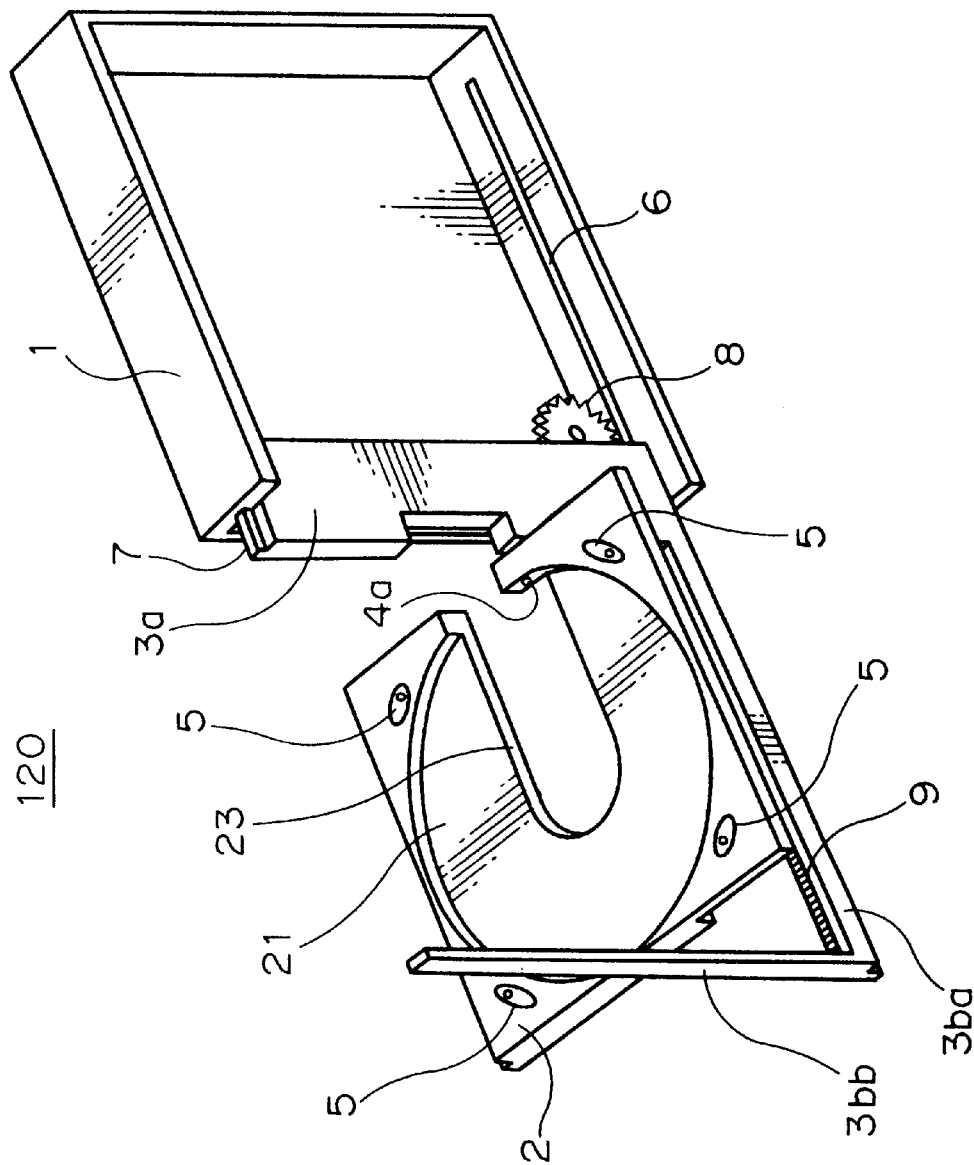
FIG. 9 is a perspective view illustrating an apparatus in accordance with the third embodiment.

FIG. 9 illustrates an apparatus in accordance with the third embodiment of the present invention. The illustrated apparatus 120 is structurally different only in that a connection shaft 4 rotatably connects the disc tray 2 to the first member 3a of the member 3. The structure other than the connection shaft 4 is the same as the apparatus 100 illustrated in FIGS. 4 and 5.

The apparatus 120 is operated in the same way as that of the apparatus 100 in accordance with the first embodiment. The driver system as illustrated in FIGS. 7, 8A and 8B for automatically rotating the connection shaft 4a may be provided with the apparatus 120.

In addition, the second member 3b comprised of the first and second plates 3ba and 3bb may be omitted, if necessary. As an alternative, only the second plate 3bb may be omitted.

Though the disc tray 2 is rotatably connected to the member 3 through the connection shaft 4 or 4a in the above-mentioned first to third embodiments, the disc tray 2 may be rotatably connected at opposite edges thereof to the member 3. Namely, the disc tray 2 may be connected to the member 3 through both the connection shafts 4 and 4a.

[Fourth Embodiment]

Figure 10:
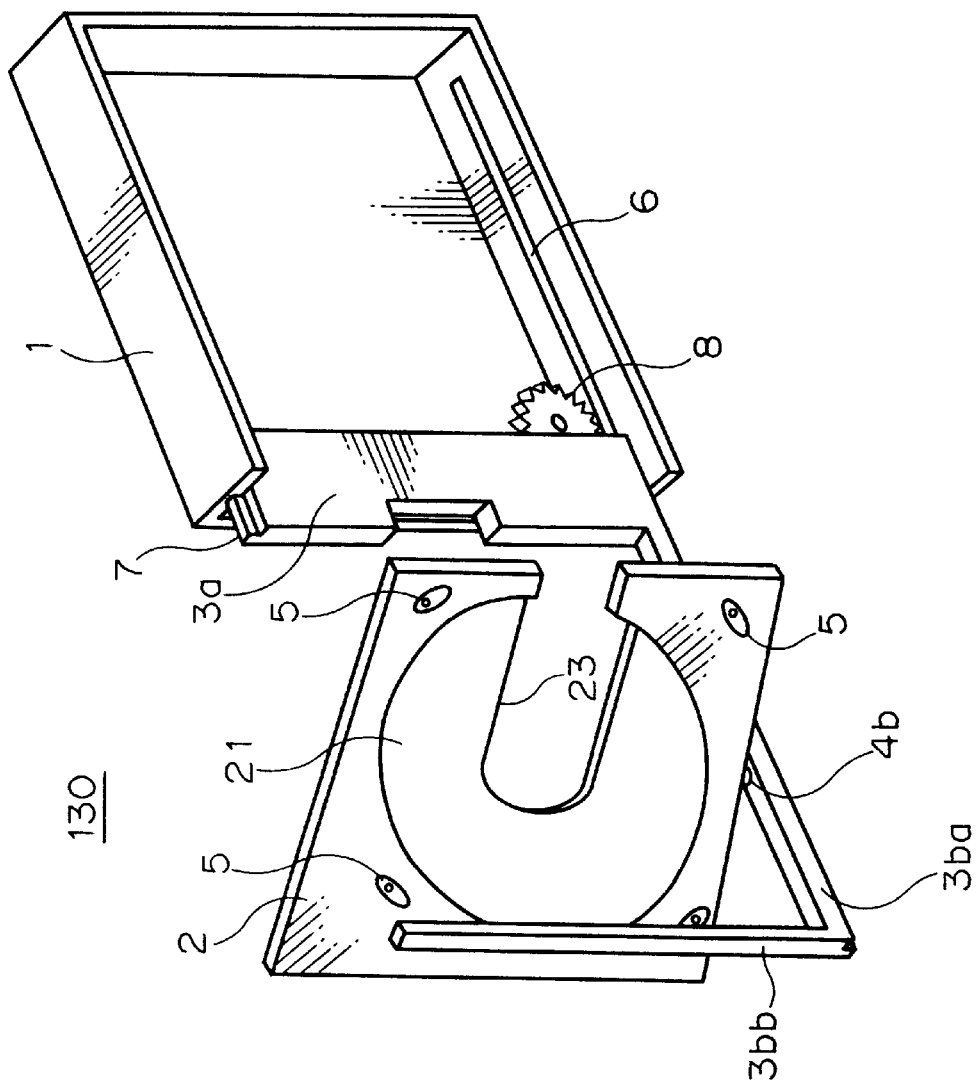
FIG. 10 is a perspective view illustrating an apparatus in accordance with the fourth embodiment.

FIG. 10 illustrates an apparatus in accordance with the fourth embodiment of the present invention. The illustrated apparatus 130 is structurally different only in that a connection shaft 4b rotatably connects the disc tray 2 to the first plate 3ba of the second member 3b. The structure other than the connection shaft 4b is the same as the apparatus 100 illustrated in FIGS. 4 and 5.

Whereas the connection shafts 4 and 4a in the first to third embodiments extend in a first direction in which the disc tray 2 is drawn out of and inserted into the case 1, the connection shaft 4b extends in a direction perpendicular to the first direction. The apparatus 130 is operated in the same way as that of the apparatus 100 in accordance with the first embodiment. In the instant embodiment, by rotating the disc tray 2 by about 90 degrees, the disc tray 2 faces an operator.

Hence, an operator could view the circular recess 21 of the disc tray 2 more clearly.

Figure 11:
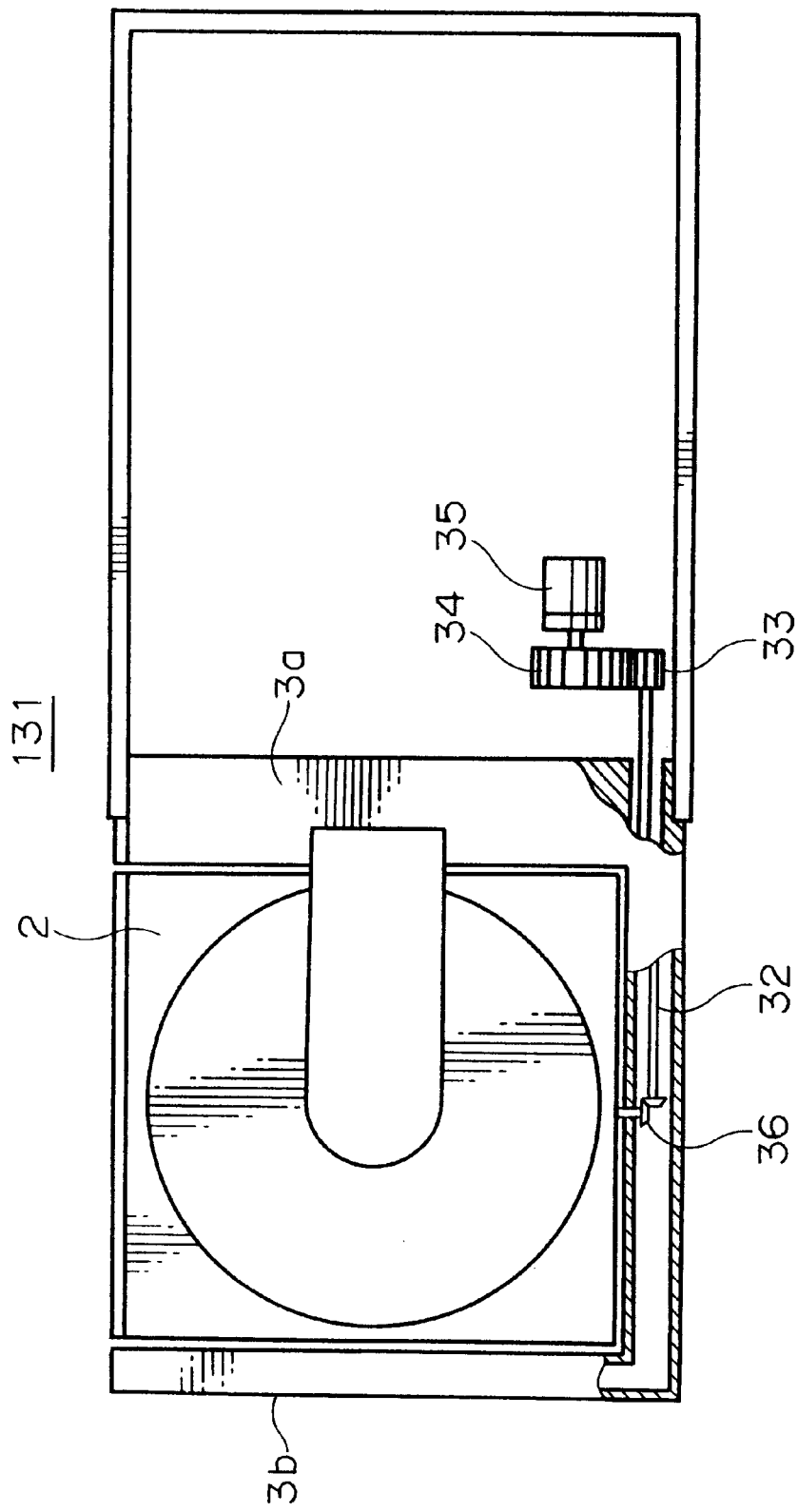
FIG. 11 is a front view illustrating an apparatus in accordance with a variant of the fourth embodiment with some parts broken away for clarification of inside of the apparatus.

The driver system as illustrated in FIGS. 7, 8A and 8B for automatically rotating the connection shaft 4b may be provided with the apparatus 130. FIG. 11 illustrates an apparatus 131 to which the driver system is provided.

As illustrated in FIG. 11, the driver is comprised of an electric motor 35, as a power source, secured to the case 1, and a transmission for transmitting a power from the electric motor 15 to the connection shaft 4b to thereby rotate the connection shaft 4b. The transmission includes a first gear wheel 34 coupled to a drive shaft of the electric motor 35, a second gear wheel 33 in mesh with the first gear wheel 34, a transmission shaft 32 fixed to the second gear wheel 33, a pair of bevel gears 36 coupled between the transmission shaft 32 and the connection shaft 4b.

In the instant embodiment, the first plate 3ba of the second member 3b is formed hollow. The transmission shaft 32 extends through the hollow first plate 3ba, and connected to one of the bevel gears 36.

An operation of the apparatus 131 is explained hereinbelow with reference to FIG. 11. By turning the electric motor 35 on, the first gear wheel 34 starts rotating. A power produced by the electric motor 35 is transmitted through the second gear wheel 33, the transmission shaft 32, and the bevel gears 36 to the connection shaft 4b. Thus, the connection shaft 4b is rotated, that is, the disc tray 2 is automatically rotated.

Similarly to the second embodiment illustrated in FIGS. 8A and 8B, a step motor may be employed as the electric motor 35.

[Fifth Embodiment]

Figure 12:
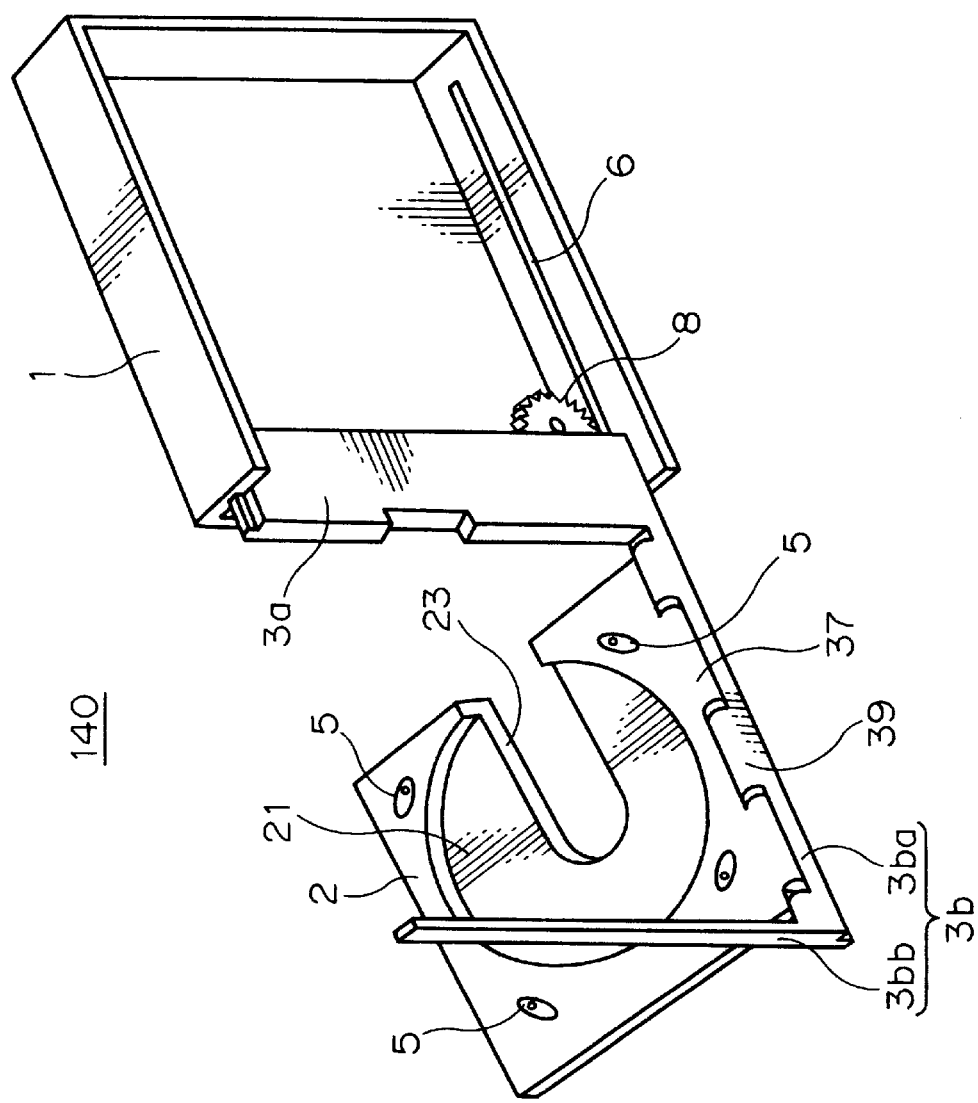
FIG. 12 is a perspective view illustrating an apparatus in accordance with the fifth embodiment.

FIG. 12 illustrates an apparatus in accordance with the fifth embodiment. In the illustrated apparatus 140, the disc tray 2 is also designed to be rotatable relative to the member 3. Whereas the disc tray 2 is designed to be rotatable by means of the connection shaft 4 rotatably connecting the disc tray 2 to the second member 3b in the first embodiment illustrated in FIGS. 4 and 5, the disc tray 2 is designed to be rotatable relative to the member 3 by means of a hinge system in the instant embodiment. The structure of the apparatus 140 except a distinction in means for rotating the disc tray 2 is the same as the structure of the apparatus 100.

Figure 13:
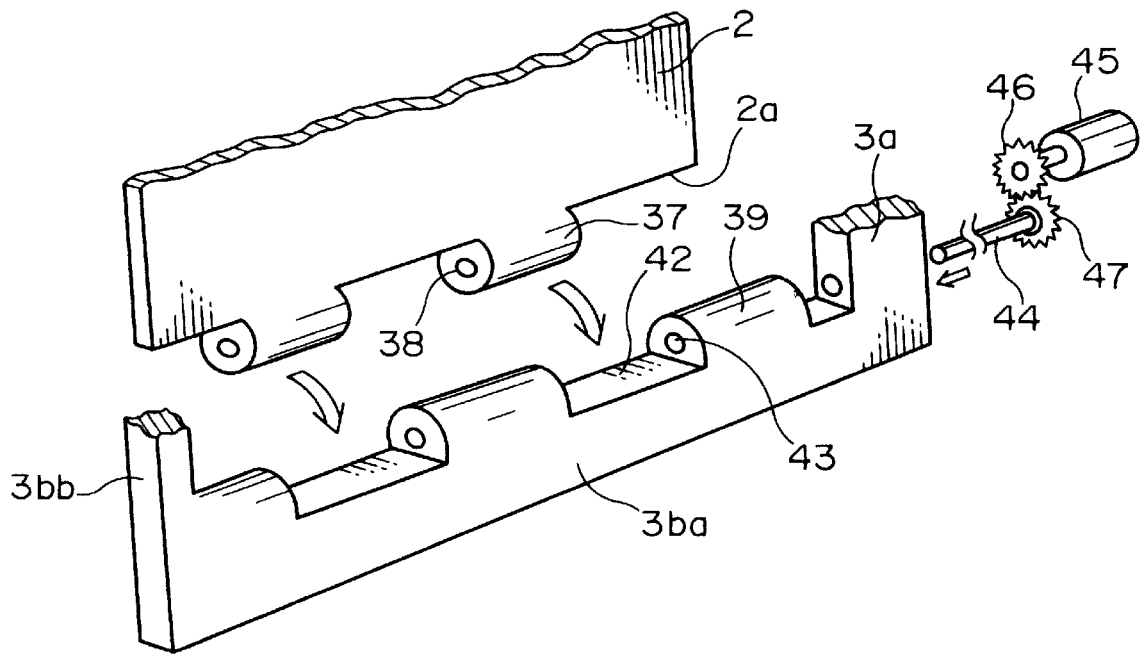
FIG. 13 is a partial, perspective view of an apparatus in accordance with a variant of the fifth embodiment.

FIG. 13 is an enlarged view of a connection between the disc tray 2 and the first plate 3ba of the second member 3b. As illustrated in FIG. 13, the disc tray 2 is formed at an edge 2a thereof with two raised portions 37 spaced away from each other at a certain pitch. Each of the raised portions 37 has a circular cross-section and is formed axially with a through-hole 38.

The first plate 3ba of the second member 3b is also formed with two raised portions 39 and two flat portions 42. The raised portions 39 are formed axially with through-holes 43. The raised portions 39 and the flat portions 42 are spaced away from each other at the same pitch as that of the raised portions 37.

When the disc tray 2 is coupled to the first plate 3ba of the second member 3b, the raised portions 37 of the disc tray 2 are set on the flat portions 42 of the first plate 3ba. In addition, the through-holes 38 of the raised portions 37 and the through-holes 43 of the raised portions 39 are aligned with one another. Thereafter, a transmission shaft 44 is inserted through the through-holes 38 and 43. The transmission shaft 44 is fixed to the raised portions 37 of the disc tray 2, but is not fixed to, or rotatably fit into the raised portions 39 of the first plate 3ba of the second member 3b.

In accordance with the fifth embodiment, the disc tray 2 is rotatable relative to the member 3 about the transmission shaft 44. Thus, the apparatus 140 in accordance with the fifth embodiment provides the same advantage as the advantage obtained by the apparatus 100 in accordance with the first embodiment, illustrated in FIGS. 4 and 5.

The driver system as illustrated in FIGS. 7, 8A and 8B for automatically rotating the transmission shaft 44 may be provided with the apparatus 140. As illustrated in FIG. 13, the driver is comprised of an electric motor 45, as a power source, secured to the case 1, a first gear wheel 46 coupled to a drive shaft of the electric motor 45, and a second gear wheel 47 in mesh with the first gear wheel 46 and fixedly connected to the transmission shaft 44.

Since the transmission shaft 44 is fixed only to the raised portions 37 of the disc tray 2, a power produced by the electric motor 45 is transmitted to the disc tray 2 for rotation through the first gear wheel 46, the second gear wheel 47 and the transmission shaft 44. Thus, it is possible to automatically rotate the disc tray 2 in accordance with the instant embodiment, similarly to the second embodiment illustrated in FIGS. 7, 8A and 8B.

Similarly to the second embodiment, a step motor may be employed as the electric motor 45, by which the disc tray 2 can be rotated by desired angles or can be stopped at a desired rotation angle.

[Sixth Embodiment]

Figure 14:
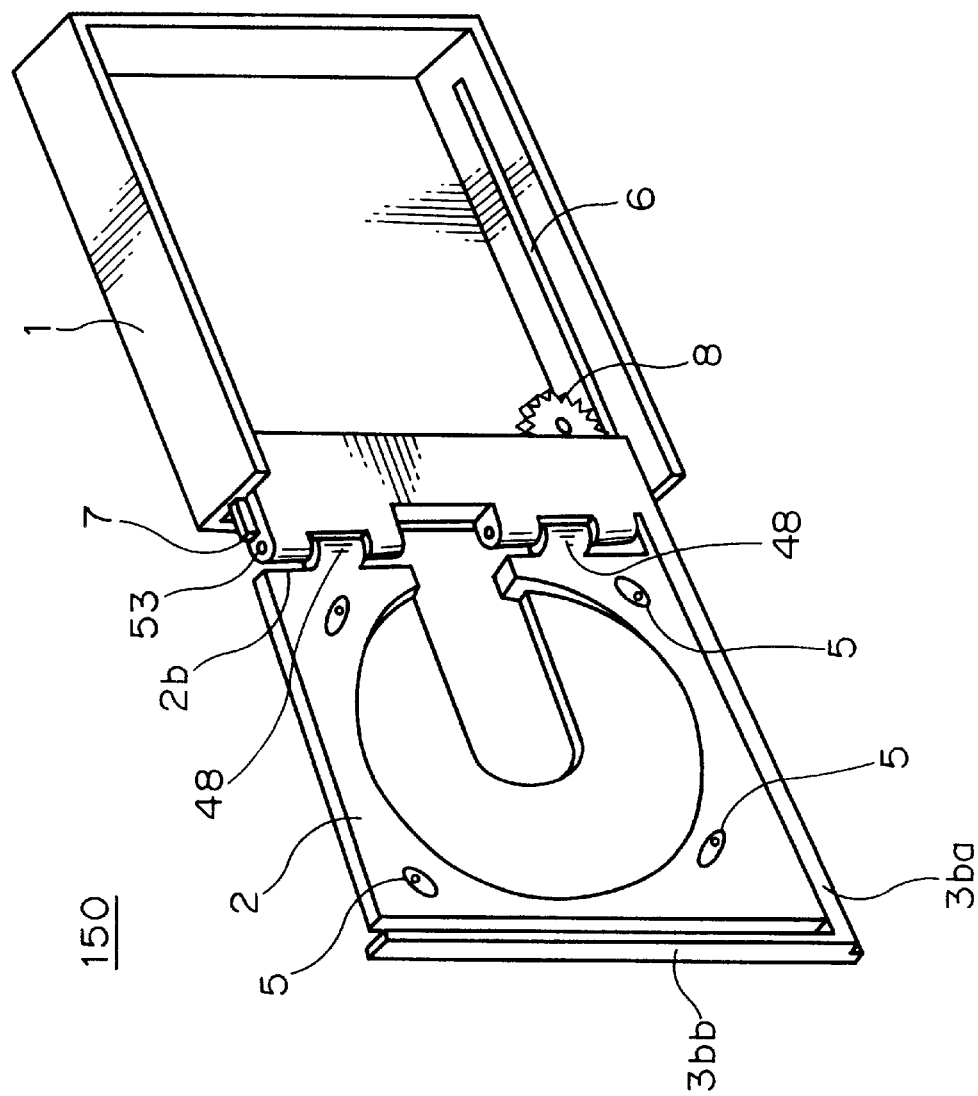
FIG. 14 is a perspective view illustrating an apparatus in accordance with the sixth embodiment.

FIG. 14 illustrates an apparatus in accordance with the sixth embodiment. In the instant embodiment, the disc tray 2 is designed to be rotatable relative to the member 3 by me a hinge system, similarly to the previously mentioned embodiment. However, the disc tray 2 in an apparatus 150 in accordance with the instant embodiment is rotated around the first member 3a of the member 3 unlike the apparatus 140 in accordance with the fifth embodiment where the disc tray 2 is rotated around the first plate 3ba of the second member 3b. The structure of the apparatus 150 except a distinction in means for rotating the disc tray 2 is the same as the structure of the apparatus 140.

Figure 15:
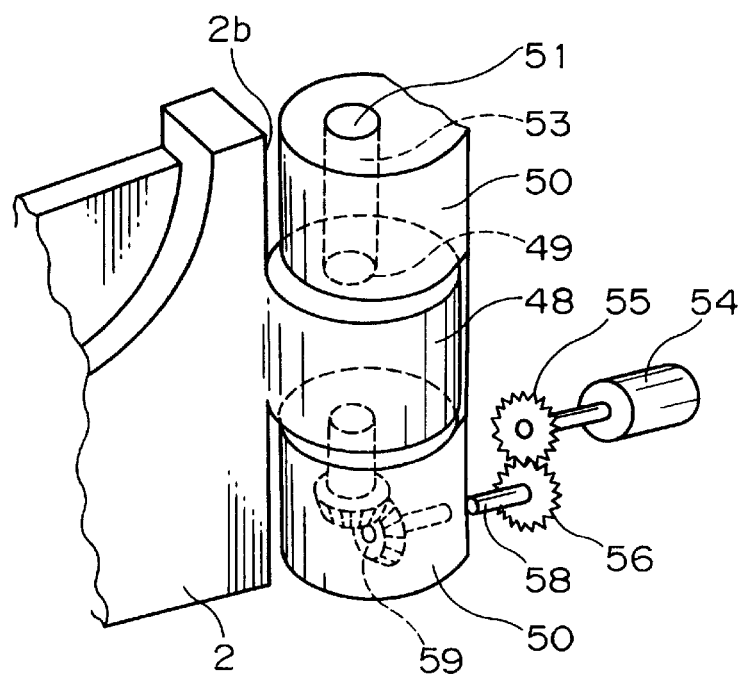
FIG. 15 is a partial, perspective view of an apparatus in accordance with a variant of the sixth embodiment.

FIG. 15 is an enlarged view of a connection between the disc tray 2 and the first member 3a. As illustrated in FIG. 15, the disc tray 2 is formed at a vertical edge 2b thereof with two raised portions 48 spaced away from each other. Each of the raised portions 48 has a circular cross-section and is formed axially with a through-hole 49.

The first member 3a is also formed with two pairs of raised portions 50. The raised portions 50 are formed axially with through-holes 51. Each pair is comprised of upper and lower raised portions which are spaced away from each other by a distance equal to a length of the raised portions 48 of the disc tray 2. Hence, the each of the raised portions 48 can be sandwiched between a pair of the raised portions 50 of the first member 3a.

When the disc tray 2 is coupled to the first member 3a, the raised portions 48 of the disc tray 2 are inserted between the raised portions 50 of the first member 3a. In addition, the through-holes 49 of the raised portions 48 and the through-holes 51 of the raised portions 50 are aligned with one another. Thereafter, a connection shaft 53 is inserted through the through-holes 49 and 51 in each pair of the raised portions 50 and the raised portions 48 sandwiched therebetween. The connection shafts 53 are fixed to the raised portions 48 of the disc tray 2, but are not fixed to, or rotatably fit into the raised portions 50 of the first member 3a.

In accordance with the sixth embodiment, the disc tray 2 is rotatable relative to the member 3 about the connection shaft 53. Thus, the apparatus 150 in accordance with the sixth embodiment provides the same advantage as the advantage obtained by the apparatus 100 in accordance with the first embodiment, illustrated in FIGS. 4 and 5.

The driver system as illustrated in FIGS. 7, 8A and 8B for automatically rotating the connection shaft 53 may be provided with the apparatus 150. As illustrated in FIG. 15, the driver is comprised of an electric motor 54, as a power source, secured to the case 1, a first gear wheel 55 coupled to a drive shaft of the electric motor 54, a second gear wheel 56 in mesh with the first gear wheel 55, a transmission shaft 58 fixed to the second gear wheel 56, and a pair of bevel gears 59 one of which is fixed to the transmission shaft 58, and the other to the connection shaft 53.

Since the connection shaft 53 is fixed only to the raised portions 43 of the disc tray 2 and not fixed to the raised portions 50 of the first member 3a, a power produced by the electric motor 54 is transmitted only to the disc tray 2 for rotation through the first gear wheel 55, the second gear wheel 56, the transmission shaft 58, and the bevel gears 59. Thus, it is also possible to automatically rotate the disc tray 2 in accordance with the instant embodiment, similarly to the second embodiment illustrated in FIGS. 7, 8A and 8B.

Similarly to the second embodiment, a step motor may be employed as the electric motor 54. The use of a step motor ensures that the disc tray 2 can be rotated by desired angles or can be stopped at a desired rotation angle.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-113193 filed on Apr. 30, 1997 including specification, claims, drawings and summary is incorporated herein by reference in its entirety.

What is claimed is:

1. An apparatus for encasing a disc-type recording medium, comprising:
   (a) a disc tray having a recess on which a disc-type recording medium is to be supported;
   (b) a case in which said disc tray is encased;
   (c) a member movable relative to said case and supporting said disc tray, said member comprising a first member bridging across a plurality of rails and a second member at least partially, circumferentially surrounding said disc tray; and
   (d) a connection shaft for connecting said disc tray to said member so that said disc tray is rotatable about said connection shaft.

2. The apparatus as set forth in claim 1, wherein said connection shaft extends in parallel with a first direction in which said disc tray is drawn out of said case and put into said case.

3. The apparatus as set forth in claim 1, wherein said connection shaft extends perpendicularly to a first direction in which said disc tray is drawn out of said case and put into said case.

4. The apparatus as set forth in claim 1, wherein said first member is bar-shaped and said second member is L-shaped, said first and second members cooperating with each other to thereby form a rectangular space therebetween, said disc tray being supported in said space.

5. The apparatus as set forth in claim 1, wherein said first and second members cooperating with each other to thereby form a rectangular frame having a rectangular space in which said disc tray is supported.

6. The apparatus as set forth in claim 2, wherein said connection shaft connects said disc tray to said second member only at an outermost edge of said second member.

7. The apparatus as set forth in claim 6, wherein said connection shaft is arranged at a midpoint of a width of said outermost edge of said second member extending perpendicular to said first direction.

8. The apparatus as set forth in claim 3, wherein said connection shaft connects said disc tray to said second member only at an outermost edge of said second member.

9. The apparatus as set forth in claim 8, wherein said connection shaft is arranged at a midpoint of a width of said outermost edge of said second member extending parallel to said first direction.

10. The apparatus as set forth in claim 2, wherein said connection shaft connects said disc tray to said first member.

11. The apparatus as set forth in claim 10, wherein said connection shaft is arranged at a midpoint of a width of said first member extending perpendicular to said first direction.

12. The apparatus as set forth in claim 2, further comprising a gear wheel rotatably supported by and in said case, and a rack formed with said member, said gear wheel being engaged to said rack when said disc tray is drawn out of and put into said case in said first direction.

13. The apparatus as set forth in claim 12, further comprising a power source for rotating said gear wheel.

14. The apparatus as set forth in claim 1, further comprising a stopper for stopping said disc tray to rotate at a desired angle.

15. The apparatus as set forth in claim 2, wherein said apparatus includes two connection shafts one of which connects said disc tray to said first member, and the other of which connects said disc tray to said second member.

16. The apparatus as set forth in claim 15, wherein each of said connection shafts is arranged at a midpoint of a width of said outermost edge of said first and second members extending perpendicularly to said first direction.

17. An apparatus for encasing a disc-type recording medium, comprising
   (a) a disc tray on which a disc-type recording medium is to be supported;
   (b) a case in which said disc tray is encased;
   (c) a member movable relative to said case and supporting said disc tray, said member comprising a first member bridging across a plurality of rails and a second member at least partially, circumferentially surrounding said disc tray;
   (d) a connection shaft for connecting said disc tray to said member so that said disc tray is rotatable about said connection shaft, said connection shaft extending in parallel with a first direction in which said disc tray is drawn out of said case and put into said case;
   (e) a power source for rotating said connection shaft; and
   (f) a transmission for transmitting a power from said power source to said connection shaft.

18. The apparatus as set forth in claim 17, wherein said connection shaft extends in parallel with said first direction.

19. The apparatus as set forth in claim 17, wherein said connection shaft extends perpendicularly to said first direction.

20. The apparatus as set forth in claim 18, wherein said transmission includes (a) a transmission shaft rotated by said power source, and (b) an endless belt set around both said transmission shaft and said connection shaft.

21. The apparatus as set forth in claim 19, wherein said transmission includes (a) a transmission shaft rotated by said power source, and (b) a pair of bevel gears arranged between said transmission and connection shafts.

22. The apparatus as set forth in claim 17, further comprising a stopper for stopping said disc tray to rotate at a desired angle.

23. The apparatus as set forth in claim 17, wherein said first member in bar-shaped and said second member is L-shaped, said first and second members cooperating with each other to thereby form a rectangular space therebetween, said disc tray being supported in said space.

24. The apparatus as set forth in claim 17, wherein said first and second members cooperate with each other to thereby form a rectangular frame having a rectangular space in which said disc tray is supported.

25. The apparatus as set forth in claim 18, wherein said connection shaft connects said second member to said disc tray only at an outermost edge of said second member.

26. The apparatus as set forth in claim 25, wherein said connection shaft is arranged at a midpoint of a width of said outermost edge of said second member extending perpendicular to said first direction.

27. The apparatus as set forth in claim 19, wherein said connection shaft connects said second member to said disc tray only at an outermost edge of said second member.

28. The apparatus as set forth in claim 27, wherein said connection shaft is arranged at a midpoint of a width of said outermost edge of said second member extending parallel to said first direction.

29. The apparatus as set forth in claim 18, wherein said connection shaft connects said first member to said disc tray.

30. The apparatus as set forth in claim 29, wherein said connection shaft is arranged at a midpoint of a width of said first member extending perpendicular to said first direction.

31. The apparatus as set forth in claim 18, further comprising a gear wheel rotatably supported by and in said case, and a rack formed with said member, said gear wheel being engaged to said rack when said disc tray is drawn out of and put into said case in said first direction.

32. The apparatus as set forth in claim 31, further comprising a power source for rotating said gear wheel.

\* \* \* \* \*